United States Patent Office 2,955,465
Patented Oct. 11, 1960

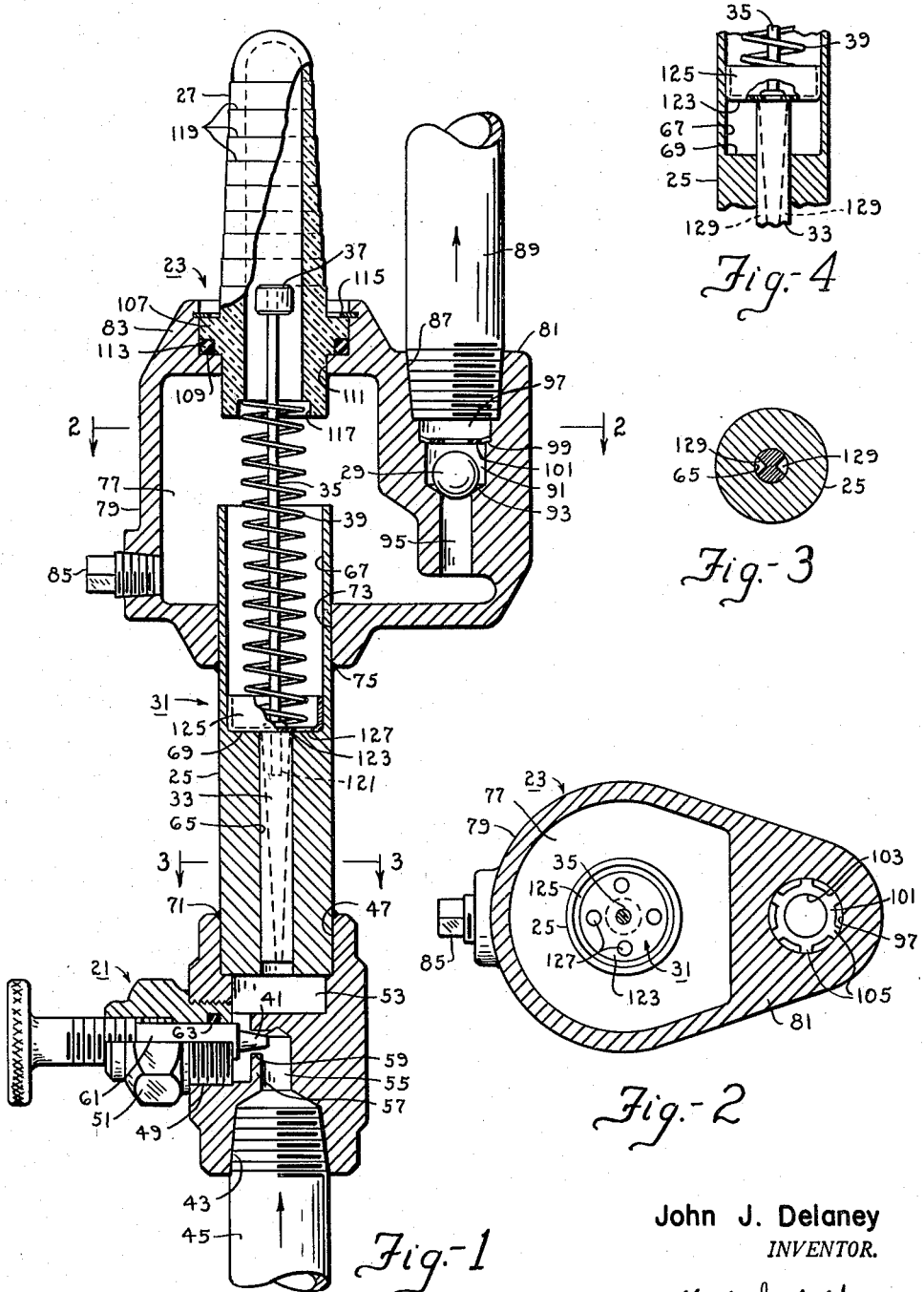

2,955,465
VISIBLE INDICATOR
John J. Delaney, Fort Wayne, Ind., assignor to Bowser, Inc., Fort Wayne, Ind., a corporation of Indiana
Filed Oct. 1, 1956, Ser. No. 612,989
5 Claims. (Cl. 73—207)

The invention relates generally to fluid pressure gauges and more particularly is directed to a device whereby the rate of flow of a liquid, such as oil in a lubricating system, may be readily ascertained by merely manipulating a valve to determine whether the rate is sufficient to supply the amount of lubricant required for a particular operation, for example, the operation of a bearing.

The device may be utilized wherever applicable and embodies important principles of design and construction, affording many advantages with respect to manufacture and assembly, installation, efficiency, operation and durability, which are not present in other devices for the same or similar purposes.

More particularly, an important attribute of the invention is to provide a device comprising, among other things, a primary valve assembly, a housing having a check valve, a tube joining the valve and housing, a casing affording a view to its interior, a movable pressure responsive unit having a metering element slidably mounted in the tube, and an indicator movable in the casing in accord with the flow or pressure of the liquid against the element when the primary valve is manually opened and the check valve is automatically opened by pressure obtaining in the device.

A particular object of the invention is to provide a device of the kind above described in which a detaining means, preferably in the form of a helical spring, is employed for maintaining the responsive unit in a predetermined position whereby to normally prevent passage of a liquid through the tube until the primary valve is opened to permit the liquid to overcome the force exerted by the detaining means.

A significant object of the invention is to provide a device in which the tube is axially aligned with the casing and provided with a bore or passage within which the metering element slides or reciprocates and a counterbore within which a connector, connecting the element and indicator, slides for stabilizing the axial position of the indicator in the casing.

Another object of the invention is to provide a casing which is preferably constructed of a material, such as transparent plastic or glass, and provided with indicia, preferably in the form of annular shoulders or steps constituting longitudinally spaced graduations or calibrations with which a bead on the indicator may cooperate or register to facilitate reading of the flow values.

A specific object of the invention is to provide the casing with a seat, with the helical spring surrounding the indicator and having its ends respectively bearing on the seat and the connector for maintaining the connector against an abutment or seat, formed by the bore and counterbore, to prevent the flow of a liquid through the tube.

A further object of the invention is to provide a unique organization of components whereby a liquid flowing through the device will not enter or circulate into the casing. This factor of maintaining the casing substantially free of liquid is very important because in some instances the liquid, for example, a black or dark colored lubricating oil, if allowed to enter the casing would envelop and render the indicator invisible, thereby preventing an operator from obtaining a reading for the purpose of ascertaining a rate or value of flow through the device.

Additional advantages and objects of the invention will become apparent after the description hereinafter set forth is considered in conjunction with the drawings annexed hereto.

In the drawings:

Figure 1 is a vertical sectional view of the device embodying the invention;

Figure 2 is a transverse section taken substantially on line 2—2 of Figure 1;

Figure 3 is a transverse section taken substantially on line 3—3 of Figure 1; and Figure 4 is a partial vertical sectional view showing the pressure responsive means in an elevated position.

The device exemplified in the drawings comprises a primary valve assembly generally designated 21, a housing generally designated 23, a tube 25 communicatively connecting the valve assembly and housing, a transparent casing 27 carried by and communicating with the housing, a check valve 29 carried by the housing, a pressure responsive unit generally designated 31 reciprocally mounted in the tube and provided with a metering element 33 responsive to liquid pressure for moving an indicator 35 having a bead or bobber 37 thereon in the casing, and detaining means 39 for normally maintaining the unit 31 in an inoperative position until a predetermined pressure obtains in the device after a valve 41 of the valve assembly 21 is opened.

Referring more particularly to the structural characteristics of the above device, the primary valve assembly generally designated 21, includes a body provided with a lower internally threaded inlet opening 43 detachably receiving a threaded end of a pipe or conduit 45; an upper cylindrical recess 47 axially aligned with the opening 43 receiving the lower end of the tube 25; and an internally threaded side opening 49 receiving a nut 51. The body is formed to provide a chamber 53 constituting a continuation of the recess 47 and further formed with a passage 55 constituting an axial continuation of the inlet opening 43. The passage 55 and the side opening are formed with a wall or partition 57 therebetween and the side opening is extended and of a size to intersect and join the chamber 53. This wall is provided with a port 59 which receives the valve 41 which is preferably frustoconical in shape for closing or opening the port for controlling the admission of a liquid under pressure through the valve body into the tube 25.

The nut 51 carries a valve stem 61 on which the valve 41 is formed. The stem has an externally threaded portion connecting with an internally threaded portion of the nut and is further provided with an enlarged knurled handle portion to facilitate manipulation of the stem. In order to assist in preventing leakage about the stem and nut, the stem is preferably provided with an annular groove containing a gasket 63.

The tube 25 joining the valve assembly 21 and housing 23 includes a lower extremity having a cylindrical axially extending bore or passage 65 and a counterbore 67 forming a cylindrical recess or passage with an abutment or seat 69 therebetween. The extremities of the tube may be attached to the valve assembly and housing in any suitable way but as shown, its lower extremity is soldered in the recess 47 in the valve assembly as indicated at 71. Its upper extremity is disposed in an opening 73 provided in a boss formed in a bottom wall of the housing and permanently soldered in place as indicated at 75. It will be noted that the upper extremity of the tube or tubular means extends upwardly into a chamber 77 formed in the housing.

The housing 23 may be designed and constructed in various ways but as exemplified in the drawing, includes the bottom wall, above referred to, through which the tube extends, a side wall 79, an offset 81 within which the check valve 29 is mounted, and a top wall 83 which carries the casing 27. The side wall is preferably provided with a threaded aperture having a threaded plug 85 therein located below the upper free end of the tube so that liquid in the chamber 77 may be discharged in a manner which will be described in detail subsequently.

The offset 81 of the housing is provided with an internally threaded outlet opening 87 detachably receiving a threaded end of a pipe or conduit 89 adapted for connection with means, such as a bearing for lubricating it. It will be noted that the inlet and outlet pipes jointly support the device. The offset 81 is also provided with a chamber 91 within which the check valve 29, preferably in the form of a ball, is movably disposed for normally engaging a concave seat 93 for preventing or checking any back flow of a liquid into the housing chamber 77 through a passage 95. The chamber 91 is counterbored to form a recess 97 and an annular shoulder 99. A retainer 101 is secured against this shoulder in spaced relation to the seat 93 to trap the ball valve in the chamber. The retainer is provided with a hole 103 which may receive a portion of the ball when the latter is unseated by the flow of liquid through the offset into the outlet pipe 89. The retainer is preferably of the self locking type having fingers 105 which bite into the wall of the chamber to hold the retainer in place. The fingers in combination with the annular wall of recess 97 define circumferentially arranged openings or ports through which liquid can properly flow when the ball is unseated.

The casing 27 may be designed and constructed in various ways but as depicted is preferably constructed of some desirable material, such as transparent glass or plastic, to constitute a window through which the bead 37 on the responsive unit 31 is visible. The casing is elongated and includes an inner cylindrical extremity having an enlarged annular portion 107 seated in a recess 109 provided in the top wall of the housing and a portion extending into the housing through an opening 111. The annular portion is provided with a rabbet having a gasket 113 therein to afford a sealed connection between the casing and housing. The casing is preferably detachably secured to the housing by a snap ring 115 which bears against the annular portion of the casing and is caught in a groove provided in the housing. The inner marginal end of this casing is preferably provided with a recess 117 which receives the upper end of the spring 39.

The upper extremity of the casing 27 is exposed and preferably tapered or generally conical in shape and provided with suitable indicia thereon, preferably in the form of rings or stepped formations to provide longitudinally spaced graduations or calibrations 119. The bead 37 of the indicator 35 is preferably adapted for selective registry with the graduations in accord with the pressure flow of the liquid through the device. The bead is preferably of a color to permit detection thereof in the casing.

As alluded to above, an important feature of the invention resides in providing an organization whereby a liquid is prevented from substantially entering the casing 27 so that a liquid, such as a black lubricating oil, will not obscure visibility of the indicator. More particularly in this regard, when the primary valve 41 is opened, liquid will flow into the chamber 77 and cause at least some air normally obtaining in the chamber and casing to be compressed in the chamber and casing 27, particularly in the outer extremity of the casing in order to prevent entry of the liquid thereto. The size and location of the casing with relation to the other components contribute to this achievement. After the device has been in use for a time, the air in the casing may become depleted, in which event, it may be reestablished by merely closing the primary valve, and removing the plug 85 to drain the liquid from the chamber 77 while the secondary valve 29 checks the back flow of liquid through the passage 95. After the liquid is drained from the chamber, the plug 85 is screwed back in place to trap air that has flowed into the chamber. The plug also serves as a means to release any undesirable foreign matter which may accumulate in the lower part of the chamber.

The pressure responsive unit 31, as alluded to above, includes the metering element 33 and the indicator 35. More particularly in this respect, the indicator is preferably made in the form of an elongated rod, the lower end of which is anchored in a hole 121 provided in the upper end of the element 33. The upper extremity of the element has a reduced portion which extends through an aperture provided in a base wall 123 of a cup-shaped connector or member 125 and is upset to permanently secure the connector to the element. The spring 39 surrounds the rod and its lower end is received in the connector and urges the connector against the abutment or seat 69. The diameter of the annular side wall of the connector is of a size to permit it to freely slide in the recess 67. The base wall of the connector is provided with a plurality of orifices or ports 127 which are normally closed by the seat 69 but permit circulation of a liquid therethrough when the pressure exceeds the force of the spring or detaining means 39. The connector serves to stabilize the axial position of the responsive means, predetermines the position of the bead 37 relative to the lowermost graduation on the casing, and act as a valve to assist in controlling the flow of a liquid through the tube.

The metering element 33 may be fashioned as desired but as illustrated is preferably made from a cylindrical solid rod having corresponding diametrically disposed V-shaped grooves 129 which taper from the guide to the lower end of the rod. In other words, the grooves extend throughout the full length of the element. These grooves in combination with the cylindrical inner surface of the bore 65 provide passages which when subjected to fluid pressure will cause a lifting or axial movement of the responsive means. Thus, passages of variable cross-sectional dimensions are provided for varying or metering the flow in accord with the pressure obtaining in the device. If the viscosity of the liquid is constant, the position of the indicator will give an accurate reading of the rate of flow of the liquid for which the device is calibrated. More specifically in this respect, an operator, by adjusting the primary valve, may regulate the position of the metering element by observing the bead 37 through the sight casing 27. By adjusting the valve until the bead 37 registers with one of the graduations or calibrations 119, the operator can readily select the particular rate of flow of a liquid, such as a lubricant, which he desires to flow to the component to be conditioned.

Having thus described my invention, it is obvious that various modifications may be made in the same without departing from the spirit of the invention, and, therefore, I do not wish to be understood as limiting myself to the exact form, construction, arrangement, and combination of parts herein shown and described.

I claim:

1. In a device of the kind described, a valve body, a housing having an air storage chamber provided with an outlet having a ball check valve therein for influencing the flow of a fluid in the outlet, said outlet being disposed in the lower portion of the storage chamber so that the air within the storage chamber above the outlet will be compressed when the fluid flows through said storage chamber, a tube communicatively connecting the body and housing, a casing carried by and extending from the housing in general alignment with the tube, said casing being constructed of a material affording a view to its interior, a pressure responsive unit having a metering element slidably mounted in the tube and an indicator movable in the casing, a valve carried by the valve body for admitting a fluid to the tube and against the metering element in a manner to move the unit so that the fluid will automatically operate the check valve and cause the indicator to take a position in accord with fluid pressures, and resilient means for normally maintaining the unit in a predetermined position until moved by fluid pressure.

2. In a device of the kind described, a valve body, a housing having an air storage chamber provided with an outlet adjacent the bottom portion, tubular means communicatively connecting the body and housing, a casing carried by and extending from the housing in general alignment with the tubular means, said casing being constructed of a material affording a view to its interior, spaced indicia provided on the casing, said chamber being so constructed and arranged that any air obtaining in the chamber will be compressed sufficiently in the casing to prevent substantial entry of the liquid into the outer extremity of the casing, a pressure responsive unit having a metering element slidably mounted in the tube and an indicator movable in the casing, a valve carried by the valve body for admitting a fluid to the tubular means and against the metering element in a manner to move the unit so that the fluid will cause the indicator to take a position relative to the indicia in accord with fluid pressures, and resilient means supported on the casing and unit for maintaining the unit in a predetermined position until moved by fluid pressure.

3. In a device of the kind described, a valve body, a housing having an air storage chamber provided with an outlet disposed adjacent the bottom portion, a tube communicatively connecting the body and housing, a casing carried by and extending from the housing in general alignment with the tube, said casing being constructed of a material affording a view to its interior, said chamber being so designed and constructed that when the liquid passes into the chamber any air obtaining therein will be compressed in the casing and thereby prevent substantial entry of the liquid thereinto, a unit having a metering element slidably mounted in the tube and an indicator movable in the tube and casing, a valve carried by the valve body for admitting a fluid to the tube and against the metering element in a manner to move the unit so that the fluid will cause the indicator to take a position in the casing in accord with fluid pressures, and a helical spring surrounding the indicator and having a portion disposed in the tube and acting on the unit for maintaining the unit in a predetermined position until moved by fluid pressure.

4. In a device of the kind described, a valve body, a housing having an air storage chamber provided with an outlet having a check valve therein, said outlet being disposed in the lower portion of the storage chamber so that the air within the storage chamber above the outlet will be compressed when the fluid flows through said storage chamber, a tube communicatively connecting the body and housing, said tube having a bore and a counterbore, a casing carried by and extending from the housing, said casing being constructed of a material affording a view to its interior, indicia provided on the casing, a pressure responsive unit having a metering element slidably mounted in the bore and an indicator movable in the counterbore and casing, a valve carried by the valve body for admitting a fluid to the tube and against the metering element in a manner to move the unit so that the fluid will operate the check valve and cause the indicator to take a position relative to the indicia in accord with fluid pressures, and a helical spring surrounding the indicator and having one end supported on the casing and its other end acting on the unit for maintaining the unit in a predetermined position until moved by fluid pressure.

5. In a device of the kind described, a valve body, a housing having an air storage chamber provided with an outlet disposed adjacent the bottom portion, a tube communicatively connecting the body and housing, said tube having a bore and a counterbore with a seat therebetween, a casing carried by and extending from the housing in general alignment with the tube, said casing being constructed of a material affording a view to its interior, said chamber being so designed and constructed that when the liquid passes into the chamber any air obtaining therein will be compressed in the casing and thereby prevent substantial entry of the liquid thereinto, a unit having a metering element slidably mounted in the bore and an indicator movable in the casing, a member carried by the unit and guided by the counterbore, said member having a port therein, resilient means acting on the member for holding the member against the seat to prevent fluid from passing through the port, and a valve carried by the valve body for admitting a fluid to the tube and against the metering element in a manner to move the unit so that the fluid will flow through the tube and port and cause the indicator to take a position in the casing in accord with fluid pressures.

References Cited in the file of this patent

UNITED STATES PATENTS

| 1,641,744 | Decker | Sept. 6, 1927 |
| 2,073,372 | Heidbrink | Mar. 9, 1937 |
| 2,076,562 | Heidbrink | Apr. 13, 1937 |
| 2,091,792 | Niesemann | Aug. 31, 1937 |
| 2,210,081 | Humphrey | Aug. 6, 1940 |
| 2,388,672 | Brewer | Nov. 13, 1945 |
| 2,576,687 | Krehbiel | Nov. 27, 1951 |
| 2,638,582 | Urso et al. | May 12, 1953 |
| 2,647,402 | Ibbott | Aug. 4, 1953 |